United States Patent [19]
Hill et al.

[11] Patent Number: 5,535,493
[45] Date of Patent: Jul. 16, 1996

[54] METHOD AND APPARATUS FOR DESHAFTING AND RESHAFTING ROLL CORES

[75] Inventors: John A. Hill, Olympia; Michael W. Sloan, Aberdeen, both of Wash.

[73] Assignee: Lamb-Grays Harbor Co., Hoquiam, Wash.

[21] Appl. No.: 136,656

[22] Filed: Oct. 14, 1993

[51] Int. Cl.⁶ .............................. B21D 39/04; B23P 19/04; B65H 19/30

[52] U.S. Cl. .......................... 29/407.1; 29/234; 29/426.3; 29/525; 242/533.7; 242/534; 242/530.1

[58] Field of Search .......................... 242/533.7, 533.1, 242/530.1, 530.3, 530.4, 534; 29/234, 428, 407, 426.3, 525

[56] References Cited

U.S. PATENT DOCUMENTS

| | | | |
|---|---|---|---|
| 2,736,507 | 2/1956 | Neese et al. | 242/533.7 X |
| 3,424,398 | 1/1969 | Garnier | 242/533.7 |
| 3,869,046 | 3/1975 | Gerhart | 242/533.7 X |
| 4,133,491 | 1/1979 | Yamazaki et al. | 242/533.7 X |
| 4,208,019 | 6/1980 | Dusenbery | 242/533.7 X |
| 4,384,395 | 5/1983 | Gietman et al. | 242/533.7 X |
| 5,054,708 | 10/1991 | Wiggers | 242/533.7 |

*Primary Examiner*—John M. Jillions
*Attorney, Agent, or Firm*—Seed and Berry

[57] ABSTRACT

Method and apparatus for aligning a shaft puller axis with a central axis of a shaft in a filled roll of tissue having a core and a shaft in the core, the shaft puller adjusting its axis to be coincident with the axis of the shaft, and assembling unfilled cores by axially aligning core segments and positioning the assembled core with the shaft puller to push the shaft into the unfilled cores. The core segments may be separated by a spacer ring. Combination apparatus and methods for pulling shafts and combination apparatus and methods for assembling cores and inserting shafts are disclosed.

23 Claims, 14 Drawing Sheets

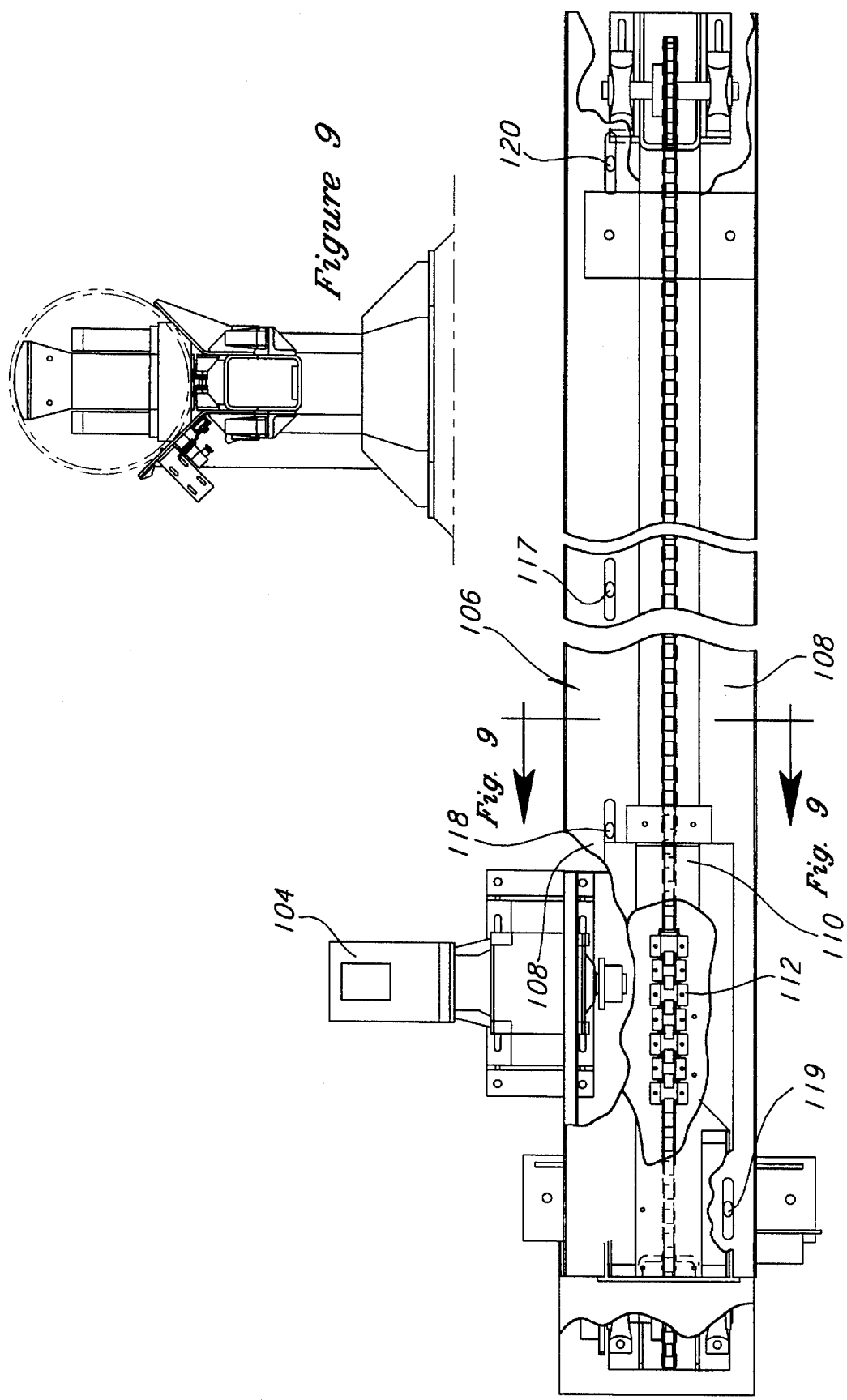

5,535,493

METHOD AND APPARATUS FOR DESHAFTING AND RESHAFTING ROLL CORES

TECHNICAL FIELD

This invention relates to methods and apparatuses for removal of shafts from paper roll cores, particularly tissue roll cores and for reinserting the shaft into unfilled cores in an automated method and apparatus.

BACKGROUND OF THE INVENTION

The removal and insertion of shafts into cores for paper rolls such as tissue rolls is a complicated and labor intensive procedure. The typical shaft, which acts as a spool or spindle, for a tissue roll may weigh 7,500 pounds. A typical core upon which the tissue is wrapped may weigh 90 pounds. It is difficult for personnel to manually handle these cores or to manipulate the shaft for removing the shaft or inserting it back into a core.

SUMMARY OF THE INVENTION

This invention is directed to an automated method and an automated apparatus for removing the large heavy shaft from rolls, particularly rolls of tissue, and reinserting a shaft into an unfilled core so that the core may be subsequently used to wind new tissue onto the roll.

It is an object of this invention to provide a method and apparatus for the alignment of a shaft puller with the central axis of a shaft in a core of a filled core of tissue when that central axis is at an angle to the horizontal.

It is an object of this invention to provide an unfilled core handling method and apparatus which reassembles core segments into a core and repositions or reinserts the shaft into that unfilled core. In particular, it is an object to accomplish the handling of core segments in bulk or batches so that they may be conveniently handled and delivered to the shaft inserting location in convenient bins.

Basically, the methods and apparatus relate to overall automated techniques for the complete handling of the shaft removal from a filled core to the reinsertion of a shaft into an unfilled core. Also, the invention relates to components of these methods and apparatus by which the shaft pulling mechanism may be aligned automatically with the central axis of the shaft in a filled core so that the axis of the shaft puller is coincident with the axis of the shaft of the filled tissue roll even if the shaft is at an angle from horizontal. Other components relate to the apparatus and method for assembling a new core from core segments and placing the segments on a shaft. In one embodiment a spacer ring is automatically inserted between the core segments to make up a larger unitary core. Still another component is the batch handling of core segments so that they may be conveniently gathered and delivered to the core insertion apparatus in a bin holding multiple vertical rows of core segments with their axes generally parallel and horizontal. Core segments may be one full length core, smaller segments of equal lengths, or segments of different lengths; and used with or without spacer rings.

The discussion of these overall inventions and component inventions is best described by referring to the detailed description of the embodiments herein.

BRIEF DESCRIPTION OF THE DRAWINGS

FIG. 1A is an alternative embodiment of a core handling apparatus.

FIG. 5A is an elevation of the core assembling section.

FIG. 5B is an elevation of the roll shaft removing and the shaft inserting section.

FIG. 5C is an elevation of the shaft pulling and shaft inserting apparatus.

FIGS. 6A–6C may be laid end-to-end and represent plan views of the overall apparatus.

FIG. 6A illustrates a plan view of the core assembling section.

FIG. 6B represents the plan view of the shaft removing and shaft inserting section.

FIG. 6C represents the plan view of the shaft pulling and shaft inserting apparatus.

FIG. 9 is a fragmentary section taken along the line 9—9 of FIG. 6A.

DETAILED DESCRIPTION OF THE INVENTION

The invention may best be understood by first describing the overall method and overall apparatus, as well as the components thereof. For this purpose, the schematics 10A–11E will be described to give an overall view of the apparatus and method of the invention.

Figure 10A:
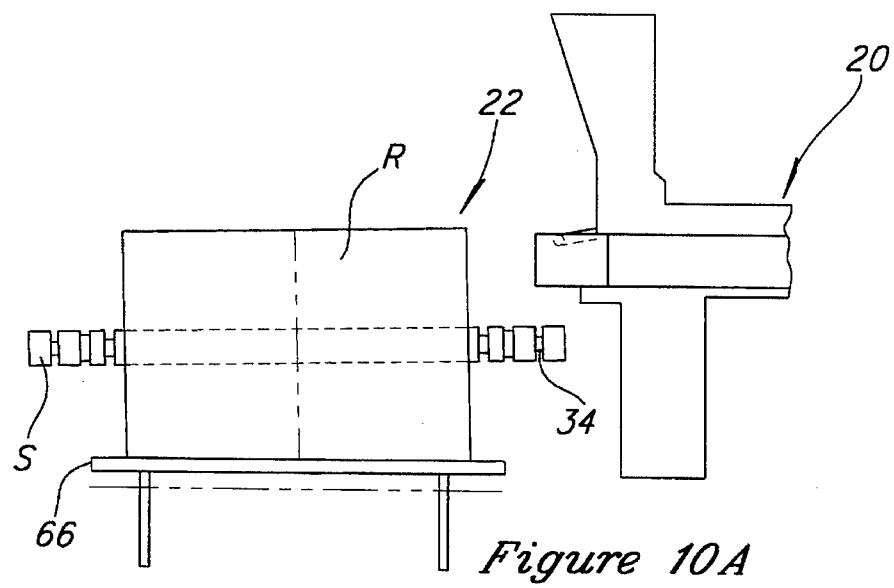
FIGS. 10A–10D are operational schematics showing the removal of a shaft from the core of a filled tissue roll.
Figure 10B:
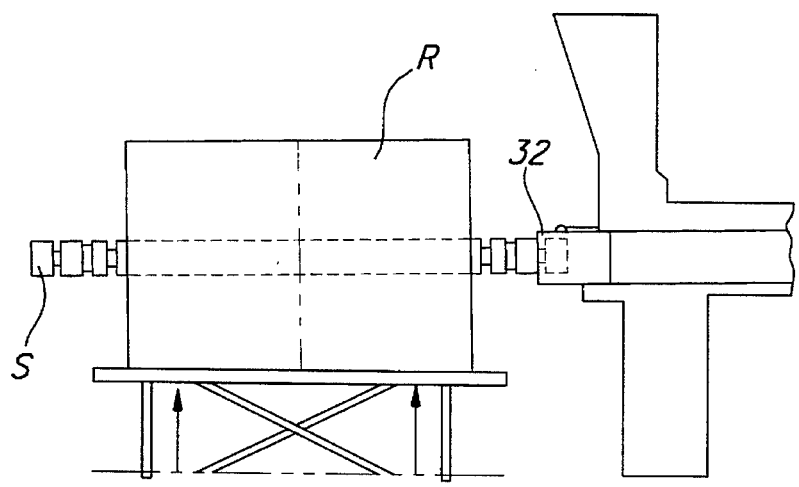

In handling large rolls of tissue the tissue roll R (FIG. 10A) is formed on a hollow core C (C1 and C2) (FIG. 11E) while the core is mounted on a large metallic shaft S. It is necessary to pull this metallic shaft from the core in the filled tissue roll and reinsert the shaft into an empty or unfilled core for use in later winding additional tissue onto a roll. The core may be a single hollow plastic or fiber tube or preferably is made of multiple core sections such as C1 and C2 (FIG. 11E) In some installations the core segments may be separated by a spacer ring SR.

Figure 10C:
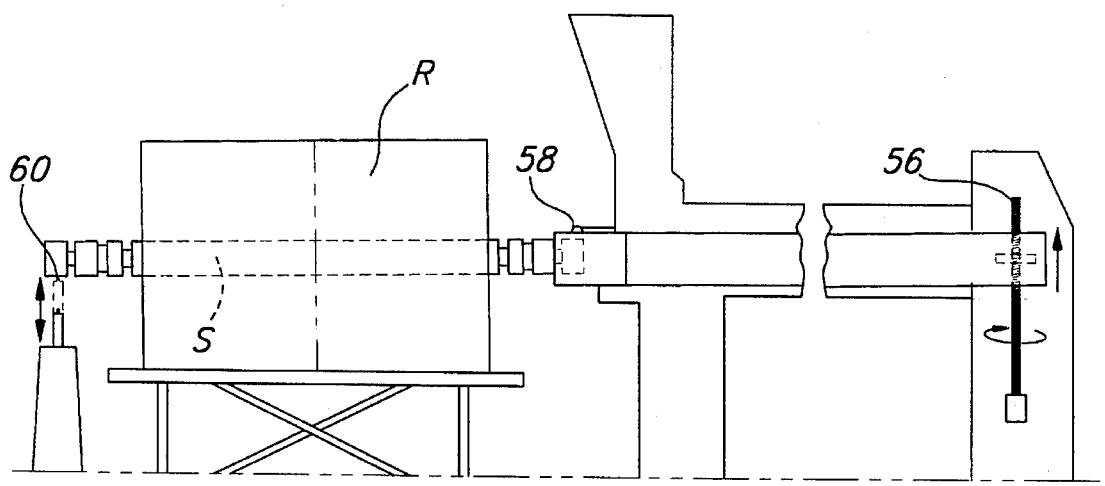
Figure 10D:
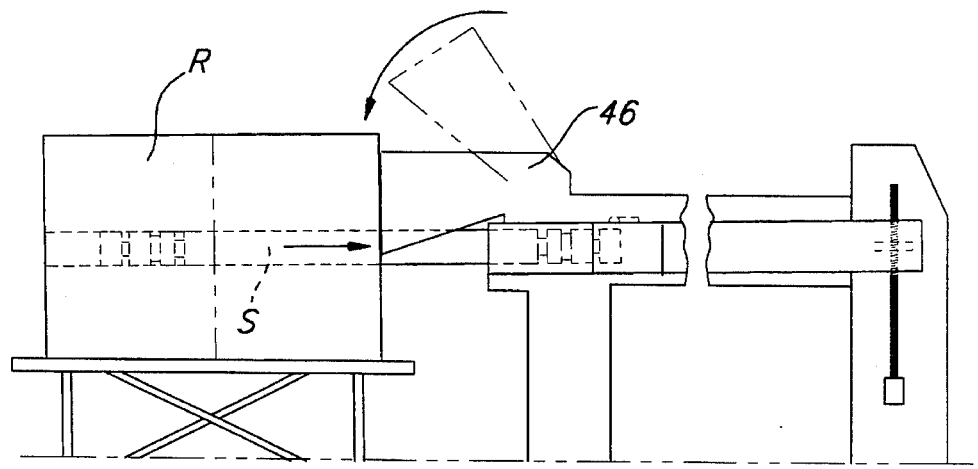

The shaft is removed as shown, for example, in FIGS. 10C–10D preferably by pulling the shaft axially outwardly from the core of a filled roll. The filled rolls are then off-loaded onto a conveyor for separation into two rolls with their individual core segments, are then weighed, labeled and taken to a subsequent processing facility. The further processing will remove the tissue from the core segment leaving the unfilled core segment to be reused. The unfilled core segment is then preferably collected and returned to have a shaft reinserted for subsequent wrapping of tissue or other paper onto the shafted core.

Figure 11A:
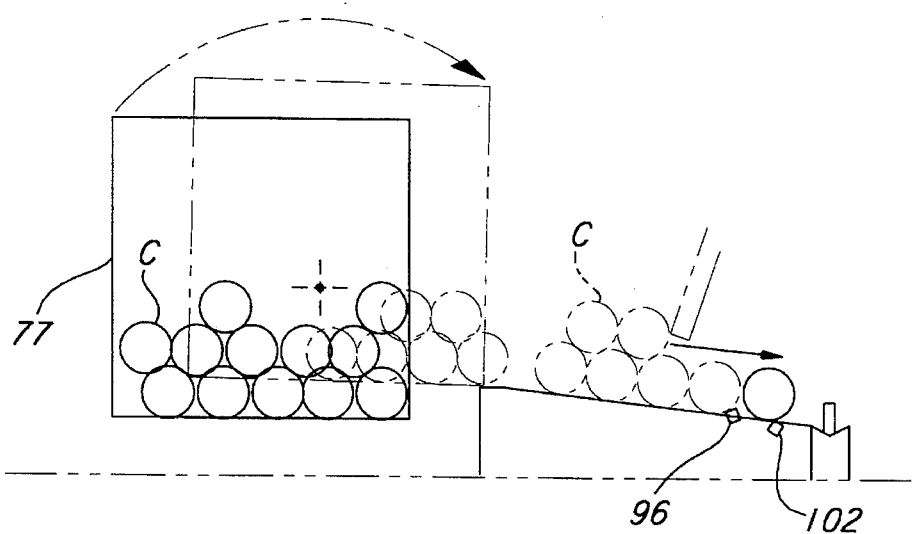
FIGS. 11A–11E illustrate schematic operational views of a core assembling and shaft insertion operation.
Figure 11B:
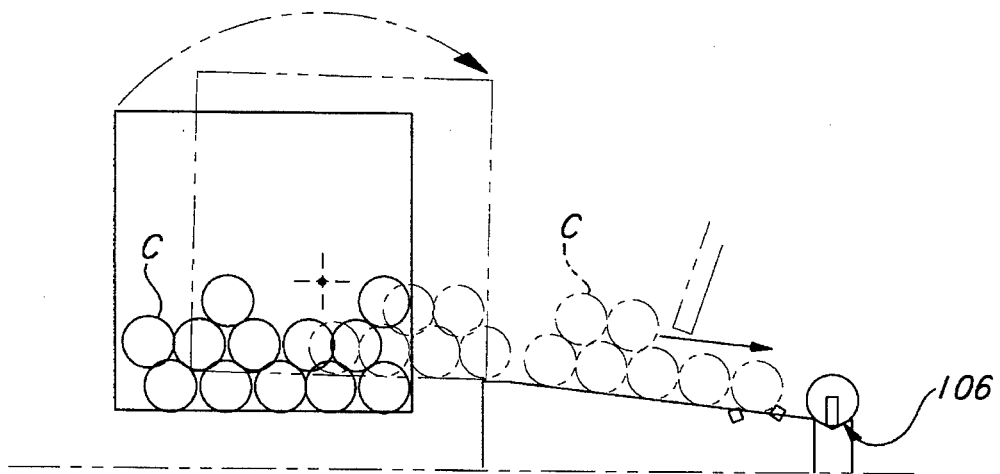
Figure 11C:
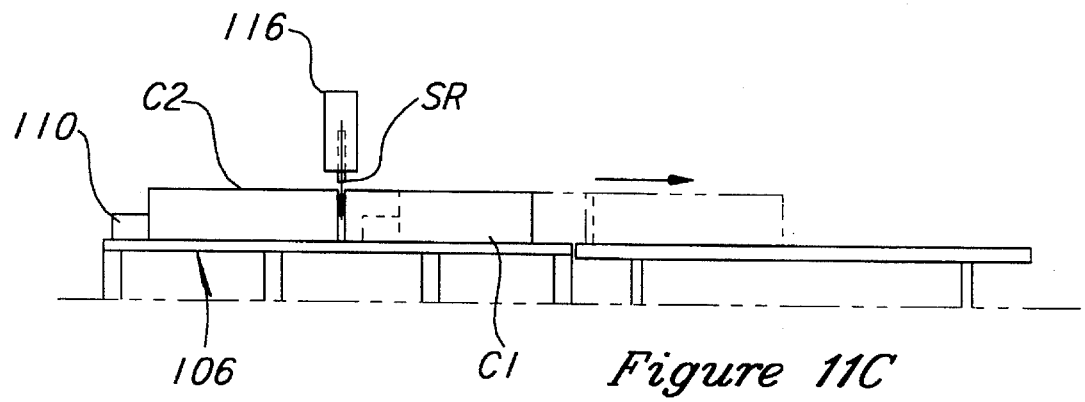
Figure 11D:
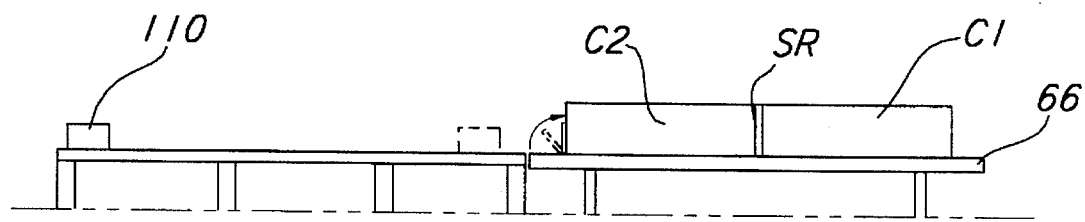
Figure 11E:
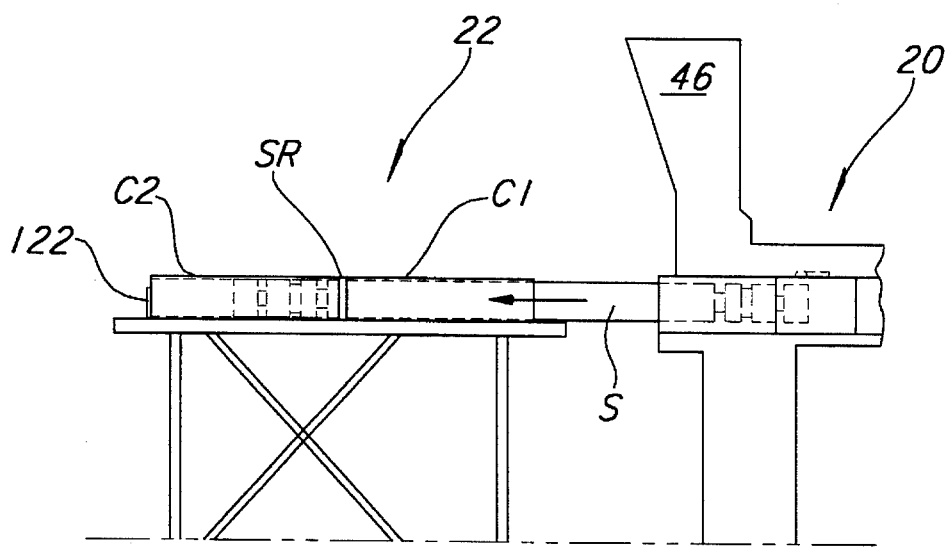

FIGS. 11A–11E illustrate the operation of returning the empty core segments, positioning them axially in end-to-end relationship such as shown in FIG. 11C and where used with a spacer ring SR, the ring is placed between the core segments. The shaft S is then pushed back into the assembled core segments as best shown in FIG. 11E. Generally, the shaft is removed from filled rolls, the rolls off-loaded, unfilled cores repositioned at the shaft puller station and the same shaft is then reinserted into a set of unfilled rolls in an alternating shaft removal and shaft insertion procedure.

Having described the overall method and apparatus and its objectives the details of the method and apparatus for carrying out the invention will now be described.

SHAFT HANDLING

Figure 1:
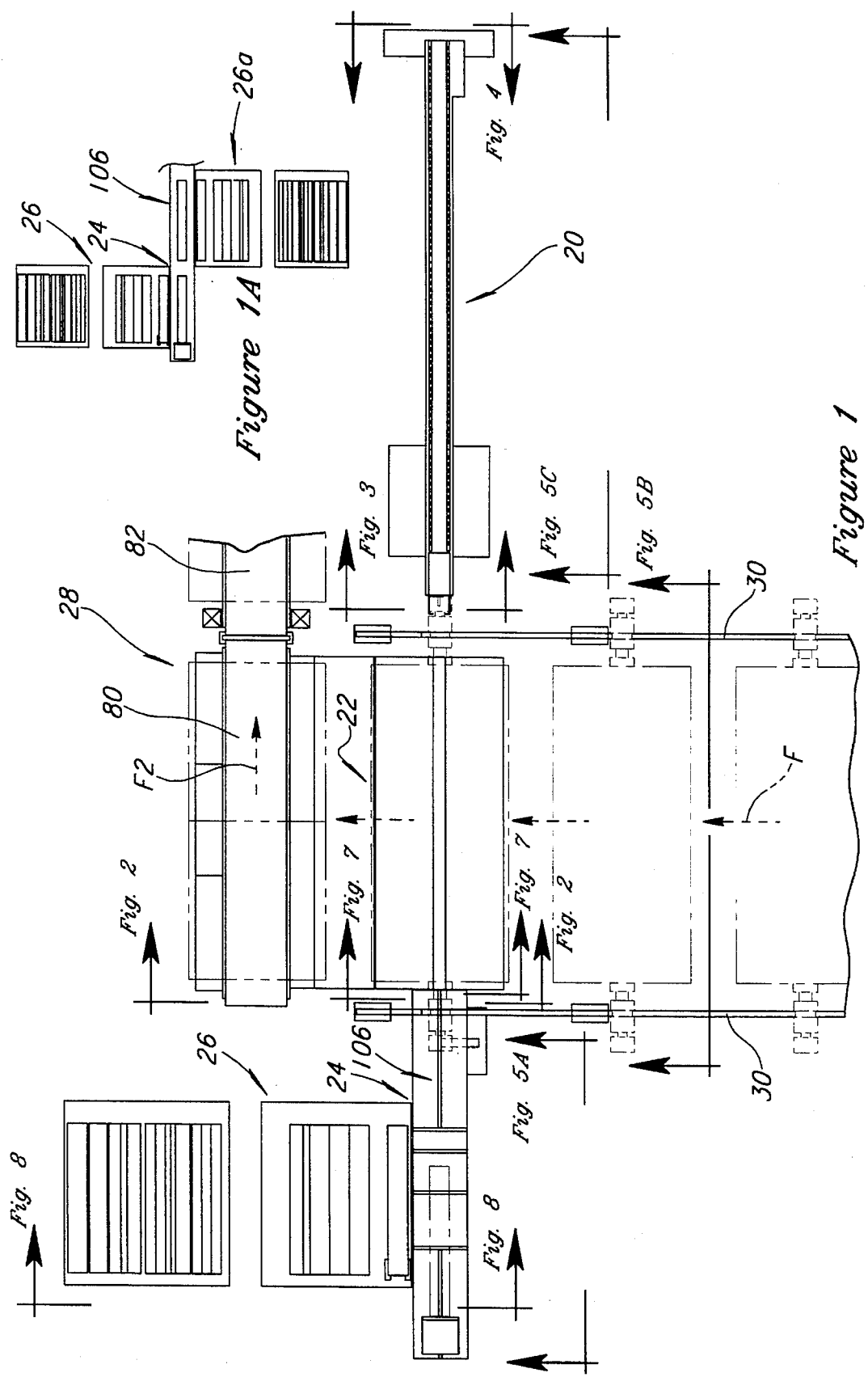
FIG. 1 is an overall schematic plan of the apparatus suitable for carrying out the methods of the invention.

As best shown in FIG. 1, a shaft removing, preferably pulling, and inserting apparatus 20 is located adjacent a shaft removing, preferably pulling, and inserting station 22. While shaft pulling is preferred the shaft could be pushed out and cores pushed on. As described hereinafter, the shaft removing apparatus will be described as pulling and inserting for brevity. A core assembling station 24 is shown axially aligned with the shaft pulling and inserting station for reassembling unfilled cores. Unfilled core handling apparatus is shown by reference numeral 26. An off-loading conveyor 28 is shown at the discharge end of the shaft pulling and inserting station. Upstream of the shaft pulling and inserting station is a set of spaced kitchen rails 30 which rotatably support the shaft S of a filled roll R. The general flow of movement of the filled rolls is in the direction of the arrow F and F2 shown in FIG. 1.

Figure 3:
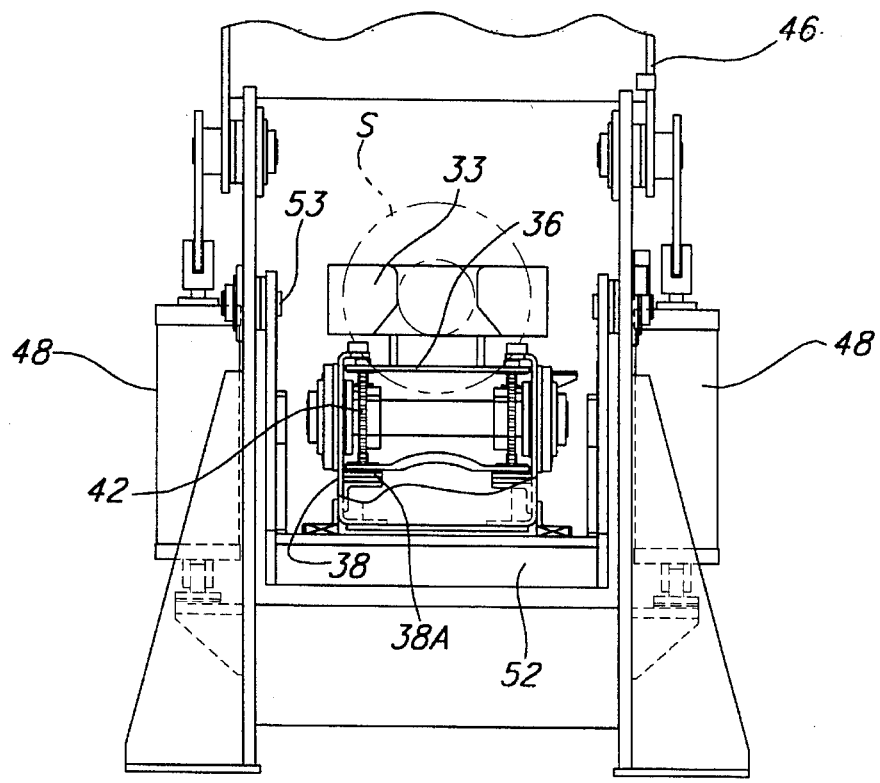
FIG. 3 is an end view taken generally along the line looking in the direction of the arrows 3—3 in FIG. 1.
Figure 5A:
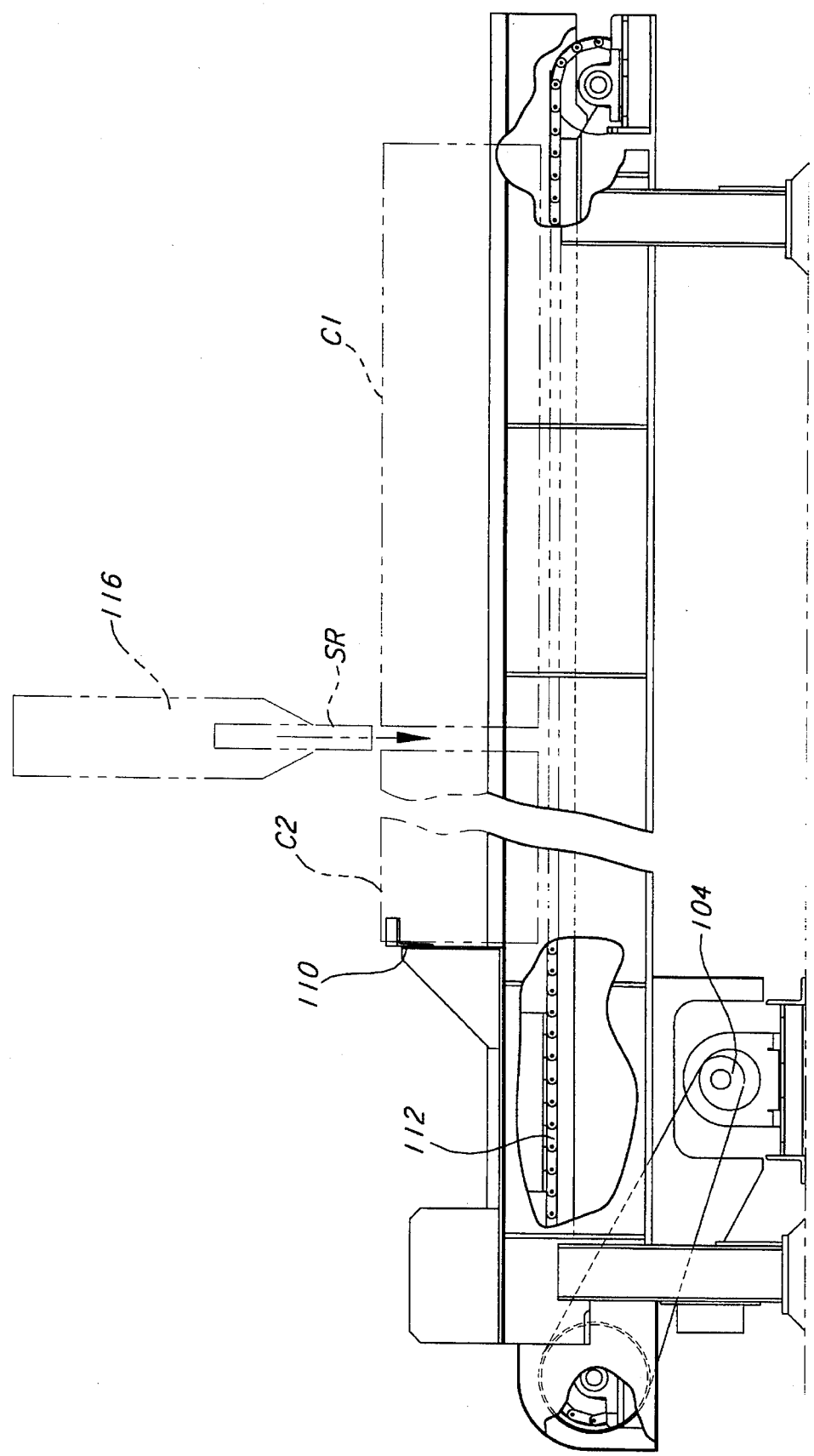
FIGS. 5A–5C may be placed end-to-end together to represent a side elevation of the apparatus shown in FIG. 1 taken generally in the direction of the arrows 5A–5C in FIG. 1.
Figure 5B:
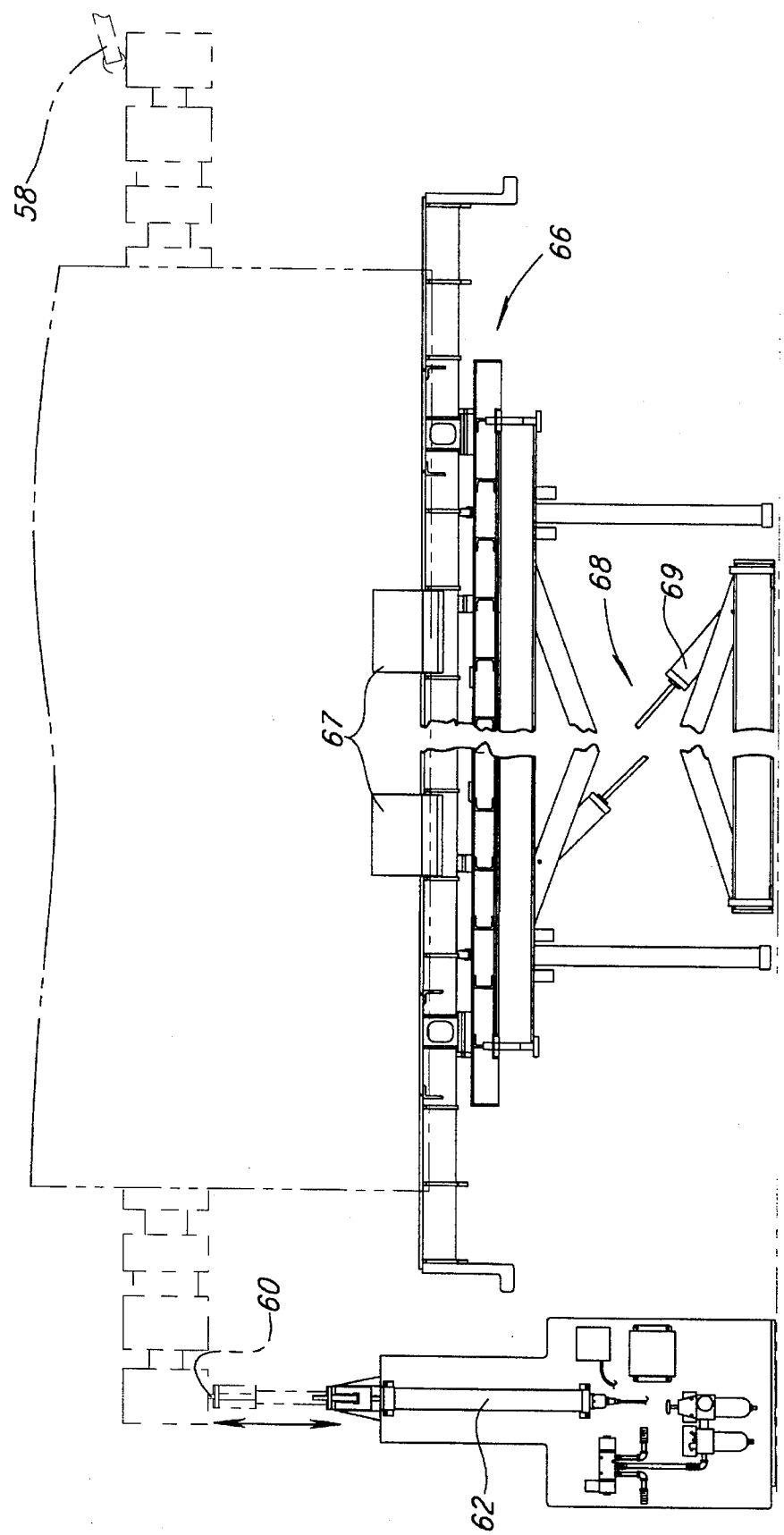
Figure 5C:
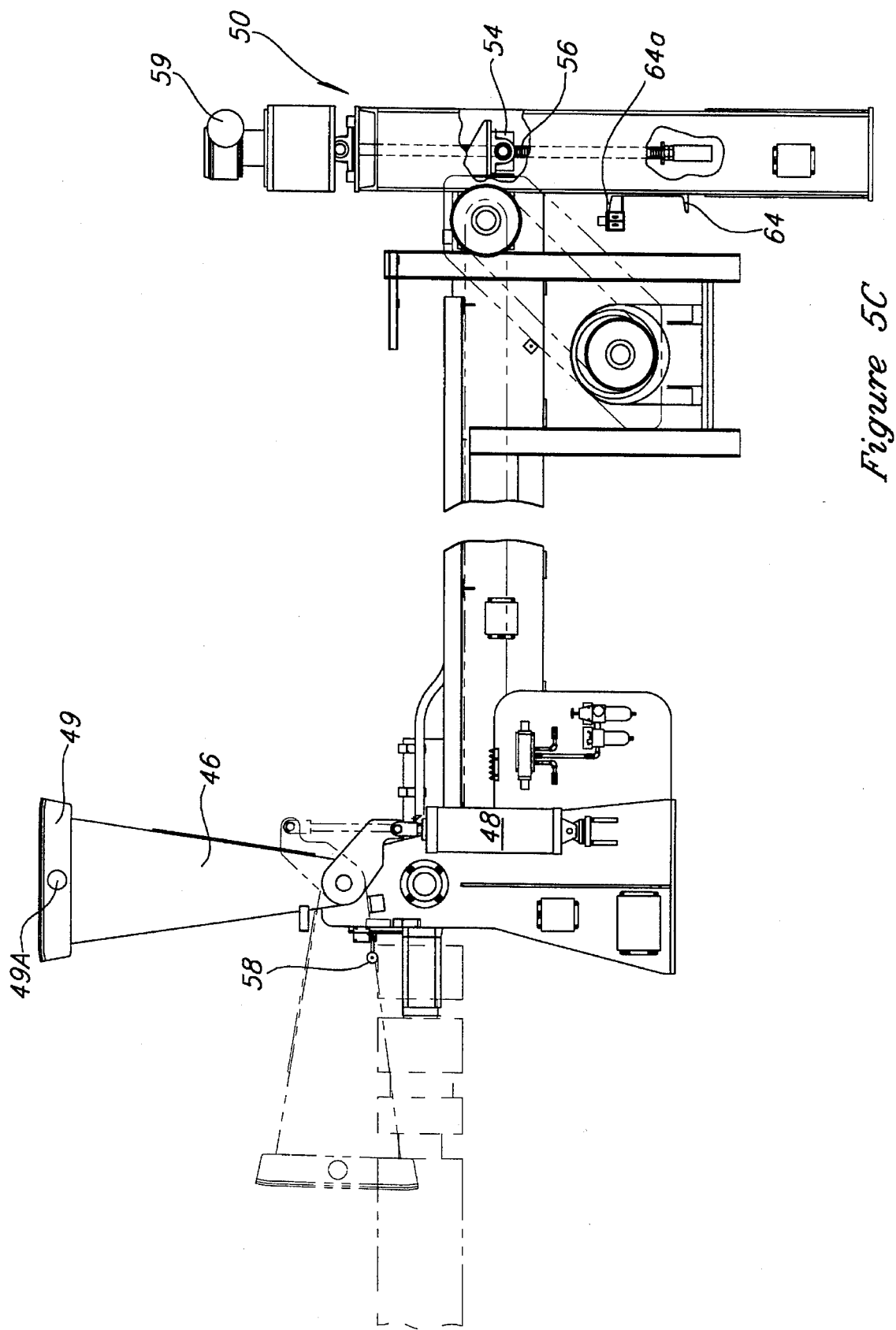
Figure 6B:
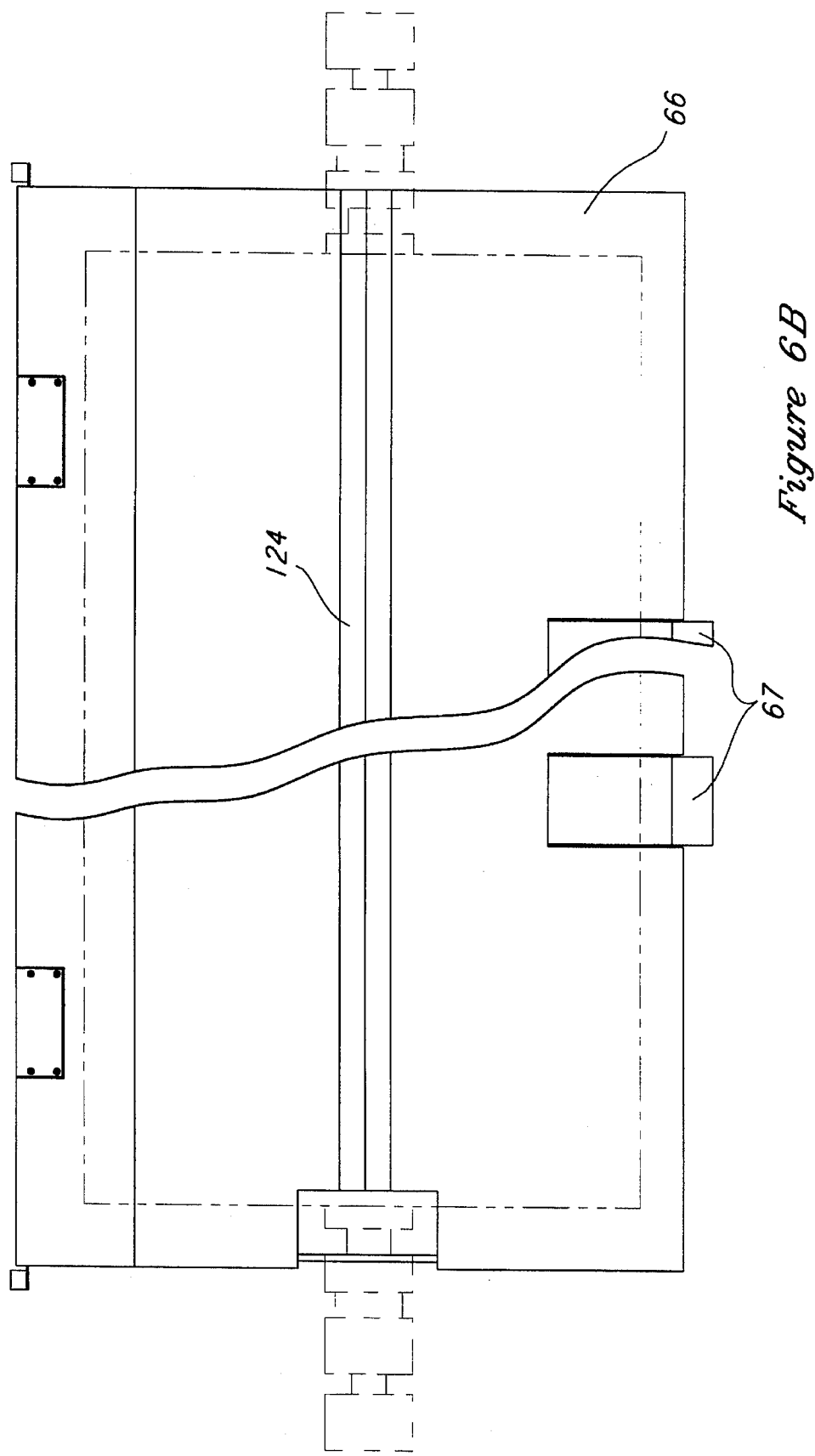
Figure 6C:
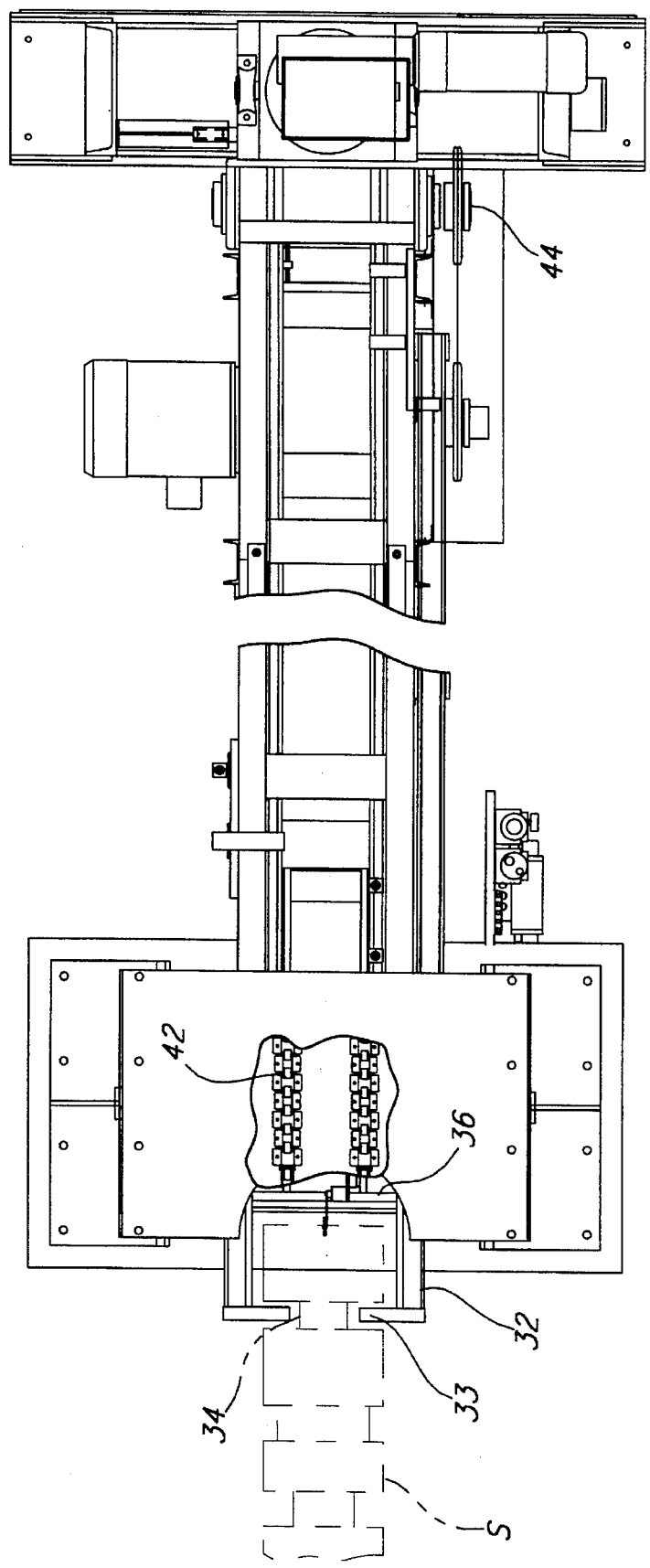

As best shown in FIGS. 3, 5C, and 6C, the shaft pulling and inserting apparatus 20 includes a shaft pulling fork 32 having inwardly directed opposed plates 33 that nest within a groove 34 in the shaft S. The fork can be pulled or pushed left or right as shown in FIGS. 5C and 6C. The forks are connected to a carriage 36 that rides in spaced channels 38 and is fixed to spaced endless chains 42. The chains are driven by conventional powered sprocket chain drive 44 at one end of the apparatus 20 and pass over idler sprockets at the opposite end. The chains are conventional roller chains of the type having rollers rotated on links to ride on horizontal flanges 38A of the channels 38. Thus, it can be seen that the forks can be retracted to the right as shown in FIGS. 5C and 6C pulling the shaft S from a core of a filled roll or the fork can be extended to the left for pushing the shaft back into an unfilled core.

The shaft pulling and inserting apparatus is provided with a pivotal roll stop 46 (FIGS. 3 and 5C) that is pivoted from the raised inoperative vertical position shown in FIG. 5C to the lowered phantom line operative position by a pneumatic actuator 48. The end of the roll stop has a pivotable face plate 49 that pivots on a post 49A and engages the end surface of the roll of tissue to hold the roll as the shaft is pulled from the roll.

Figure 4:
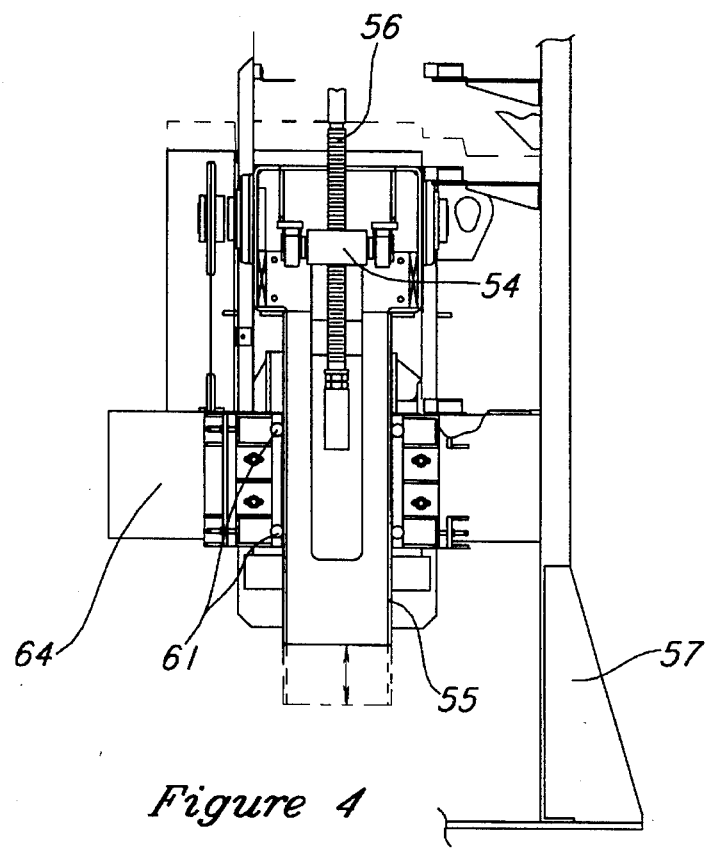
FIG. 4 is an end elevation taken generally in the direction of the arrows 4—4 as shown in FIG. 1.

A unique feature of the invention is that the shaft pulling apparatus can be inclined at an angle to the horizontal by an adjusting mechanism 50. The forward end, or roll end, of the channels is mounted on a horizontal pivotal bed 52 (FIG. 3) that pivots about pins 53 while the remote end, or rear end, of the channels is mounted on a nut 54 (FIG. 4). A rotary screw 56 supported in a fixed base 57 meshes with the nut. The nut is fixed to a vertically movable frame 55 that is guided by rollers 61 rotatably mounted on the fixed frame 57. A down signal switch 64A is fixed to a channel 64 that is rigidly attached to the frame 57. The channel serves as a stop to arrest further dropping motion of the shaft pulling apparatus. The rotary screw is driven clockwise or counter-clockwise to raise or lower the nut and thus the remote end of the shaft pulling channels by a screw drive 59 (FIG. 5C). This will change the angle of the channels and thus the shaft pulling axis with respect to the horizontal. This feature is important since large rolls of soft paper such as tissue will generally have their core axis and thus the central axis of the shaft in the core at an angle with the horizontal due to the softness of the tissue and deformities or variations in the shape of the roll. To effectively pull the shaft from the roll, therefore, it is desirable to align the shaft pulling apparatus so that the shaft pulling axis is coincident with the axis of the shaft in any particular tissue roll.

The angularity of the shaft is determined by a sensor or limit switch 58 (FIGS. 5B and 5C) mounted adjacent to the pulling fork 32 at the roll end of the shaft pulling apparatus 20. A remote sensor or limit switch 60 (FIG. 5B) is at the opposite end of the shaft. The limit switch 60 is connected to the rod of a pneumatic cylinder or other actuator 62 shown in solid lines in its retracted position in FIG. 5B. The cylinder 62 gives position feedback to motor 59 using a conventional linear variable displacement transducer (LVDT) or other common means to show the elevation. The rod extends until the limit switch contacts the shaft. The LVDT determines the angle of the shaft. After contacting the shaft the rod is automatically retracted by the actuator 62. The angle measurement is then transmitted by conventional means to the motor 59 to rotate the screw 56 and thus raise or lower the remote end of the shaft pulling apparatus to match the angularity of the shaft in the filled tissue roll. This operation occurs automatically so than for any particular filled tissue roll the angularity of the shaft can be determined and the shaft pulling axis adjusted to be coincident therewith.

Figure 2:
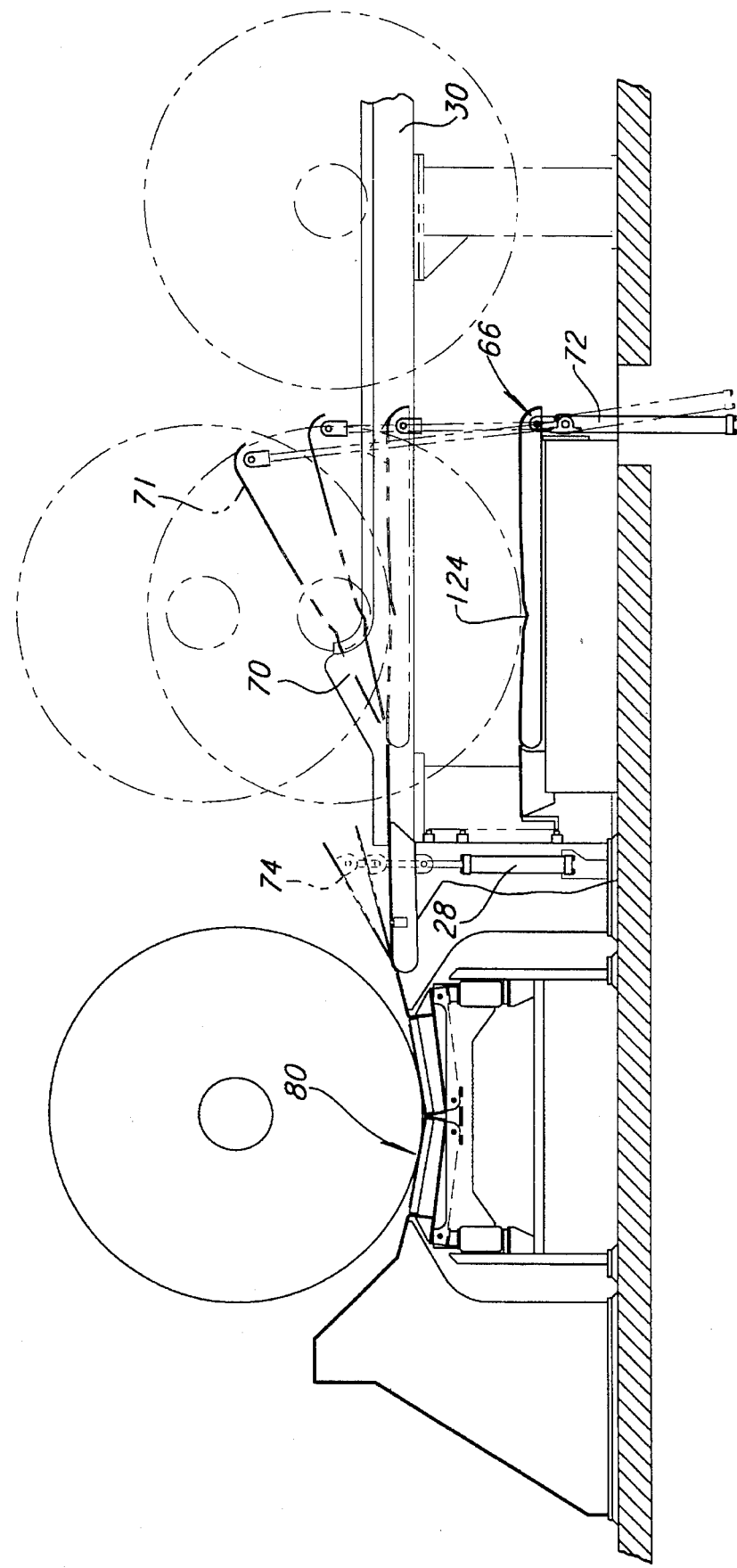
FIG. 2 is an enlarged fragmentary side elevation taken along the line generally 2—2 of FIG. 1.

As best shown in FIGS. 1, 5B and 6B, a filled roll traveling on the kitchen rails 30 is delivered to the shaft pulling and inserting station 22. The roll is deposited on a table 66 that is elevated by a conventional scissor lift 68. The scissors are powered by a hydraulic ram 69 in a known manner to raise and lower the table to various elevations. As best shown in FIG. 2, the kitchen rails 30 support the shaft and advance by gravity one roll at a time until a roll encounters the fixed stops 70 above the table 66. A one-way stop 67 is pushed down by the advancing roll but swings back up as shown in FIG. 7A to prevent rearward movement of the roll off the table. The table then is raised to lift the roll upwardly until the groove 34 of the shaft nests in the plates 33 of the pulling fork 32. The shaft is raised until the upper surface of the shaft engages the limit switch 58 at which time the table halts. Next, the ram 62 raises the sensor 60 at the remote end of the shaft until the sensor contacts the lower surface of the remote end of the shaft. As discussed earlier, this information is fed to the servo-motor 59 which rotates the screw to raise or lower the channels 38 of the shaft pulling apparatus so that the shaft pulling axis is aligned with the central axis of the shaft in the roll.

After the shaft has been pulled, the top surface 71 (FIG. 2) of the table 66 is raised by ram 72 to the uppermost phantom line position rolling the shaftless roll onto a tilt table 74. A ram 76 tilts the tilt table upwardly rolling the rolls or roll onto a discharge conveyor 80.

Since a roll is often comprised of two separate rolls R1 and R2 that are on separate core segments, the rolls are separated by moving the roll on the discharge conveyor in the direction of the arrow F2 to the right in FIG. 1 until the first roll R2 is moved onto a weighing conveyor 82 and about 8 inches of the second roll R1 overlies the weighing conveyor 82. The discharge conveyor is then stopped and the weighing conveyor continued to separate the first roll R2 from the second roll R1. If the rolls do not separate, a roller breaker (not shown) may be employed to separate the rolls or they may be manually separated.

At this time, the rolls have been cleared from the shaft pulling and insertion station, the pulled shaft S is resting on the shaft pulling and inserting apparatus 20 and the table 66 will then be lowered to its lowermost position to receive a new assembled core.

CORE HANDLING

Figure 8:
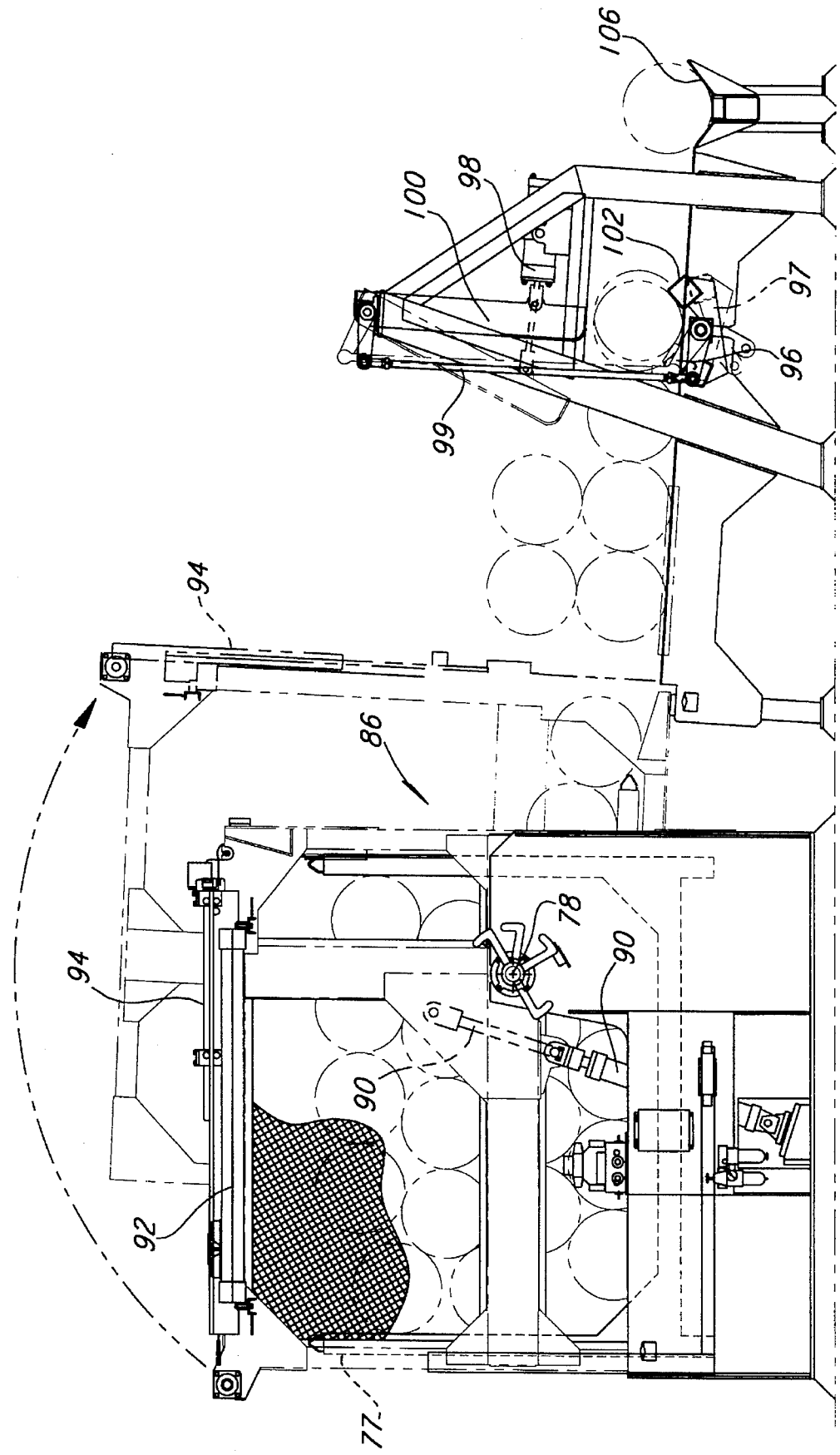
FIG. 8 is a side elevation of the unfilled core handling apparatus taken generally in the direction of the arrows 8—8 of FIG. 1.

Unfilled or empty cores are collected at the tissue processing facility and delivered in bins 77 (FIG. 8) to be reassembled and have the shafts placed into the unfilled cores. These cores will be either a full length segment, two segments of equal or unequal length, and may have a spacer ring between the segments depending on the processing facility. As best shown in FIG. 8, the bin of cores or core segments are delivered to a tipper mechanism 86. The tipper mechanism is supported on a pivot 78 and tilted ninety degrees by a set of rams 90 to move from the solid line position to the dotted line position shown in FIG. 8. After the bin is tilted, a pneumatic cylinder or other actuator 92 opens a forward gate 94 so that the core segments roll out in two or more vertical rows as shown in FIG. 8. The forwardmost lower core segment is stopped by a bar stop 96 that is attached to rocker arm 97. The bar stop is activated by an actuator 98 which simultaneously oscillates a linkage 99 connected to the rocker arm and a stop lever 100. The stop lever holds the uppermost core segment from advancing when the bar stop bar 96 is lowered allowing only the forwardmost lower core segment to roll by gravity against an upraised bar stop 102 fixed on the opposite end of the rocker arm 97. Each time the rocker arm is oscillated, a core segment is released from the stops and rolls onto a trough 106.

As best shown in FIGS. 1, 5A and 6A, a core segment is slidably carried on the trough 106 with the core segment centered between the sloped side walls 108 of the trough. A pusher 110 is fixed to an endless chain 112 that is driven by a conventional chain drive 104. The pusher pushes against the end of the core segment C1 or a single integral core if there is only a single larger core pushing it to the right as shown in FIG. 6A. The core segments are combined to make an elongated core upon which two rolls of tissue are wrapped.

In some installations the core segments are separated by a spacer ring SR (FIG. 5A). For this purpose, and as best shown in FIG. 6A, the trough 106 is provided with sensors to determine the position of the segments and for releasing a spacer ring from a chute 116. A first sensor 117 determines when the pusher head has pushed the first core segment C1 into the end of the trough in position for assembling it into a completed core. The pusher head is then returned to its home position which is sensed by a second sensor 119. Another core segment is placed in front of the pusher. The pusher then advances again to the right until its position is sensed by a third sensor 118. This third sensor then stops the pusher head with core segments C2 and C1 spaced from one another as shown in FIG. 5A. The spacer ring SR is then dropped from the chute 116 between the two core segments. When the spacer ring is in place, the pusher then pushes the combined core segments and spacer ring further to the right until the combined core is resting on the table 66 at the shaft pulling and inserting station 22 (FIG. 1). This position is determined by a sensor 120 at the right of the trough.

Figure 7:
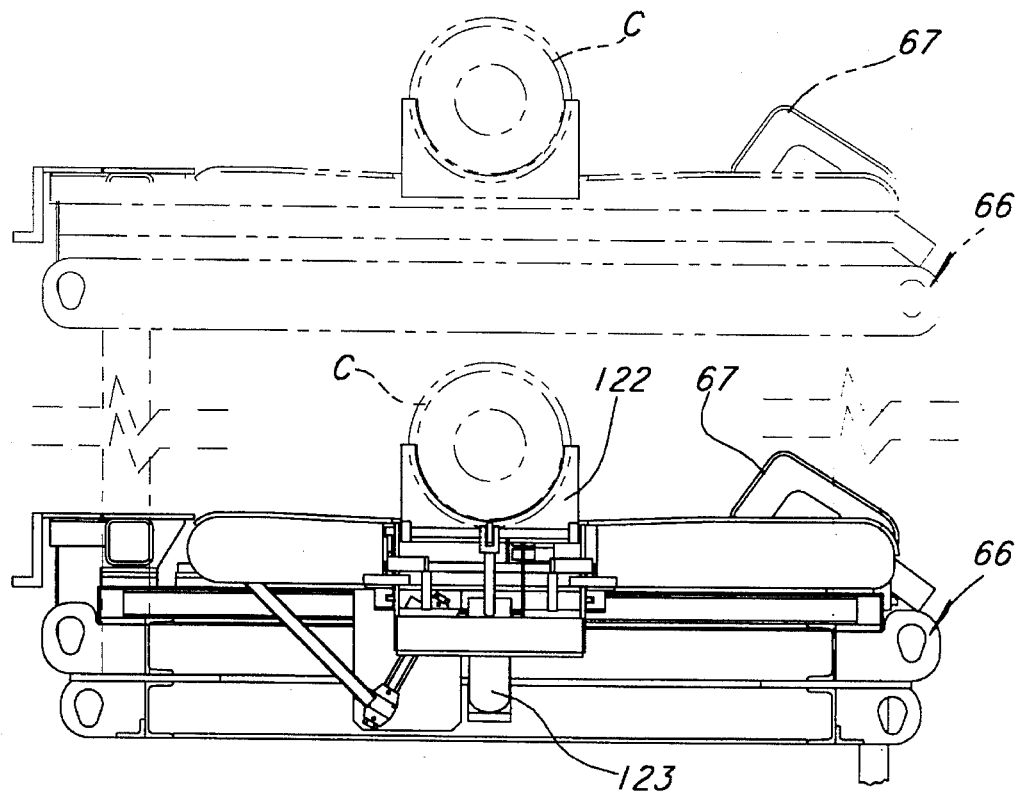
FIG. 7 is an end elevation of the shaft inserting and shaft removing section showing a portion of a table in which the core is supported when a shaft is inserted and looking generally in the direction of the arrows 7—7 of FIG. 1.
Figure 7A:
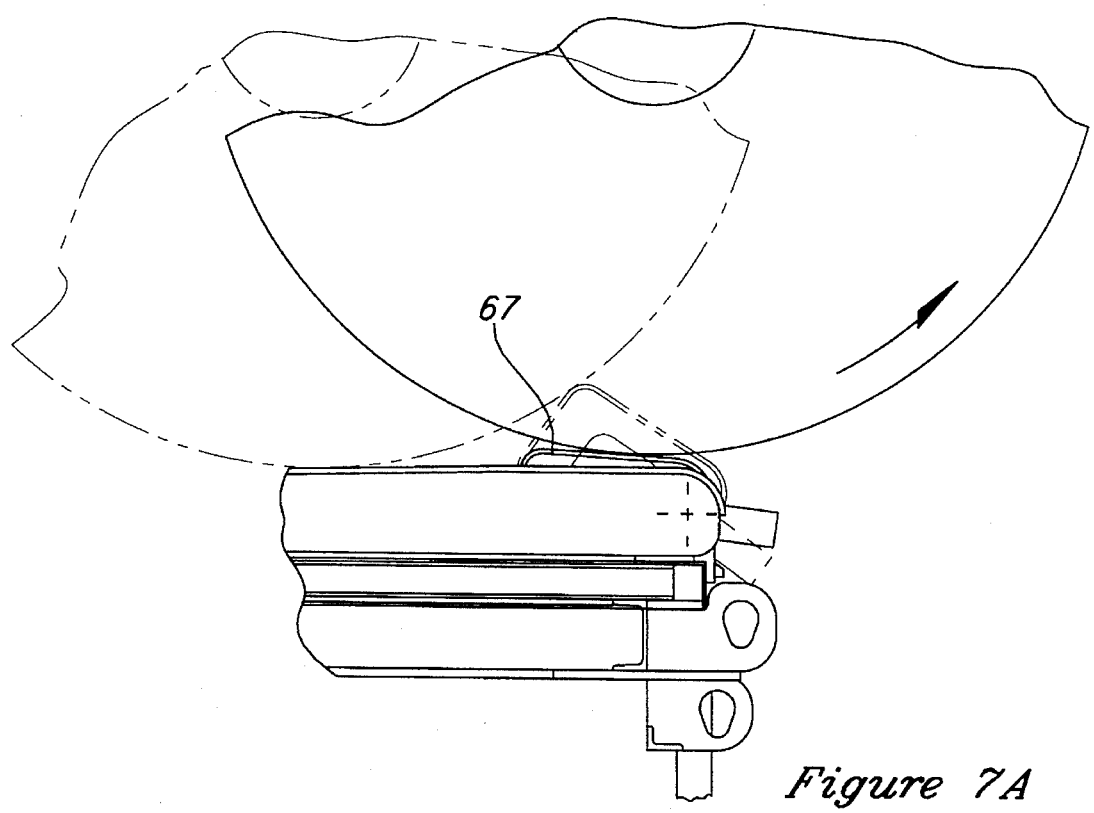
FIG. 7A is an enlarged detail thereof.

With the assembled core positioned at station 22, the table 66 is then raised from the solid line position shown in FIG. 7 to the elevated phantom line position. Also, a core end stop 122 is raised by an actuator 123 to prevent movement back to the left (as shown in FIG. 1) on the table. The table has a slight depression running the length thereof and identified by the numeral 124 (FIG. 6B) to maintain the core centered on the table.

Once the table is raised to the elevated position, the shaft resting on the shaft pulling and inserting apparatus 20 is moved to the left (as shown in FIG. 1) and the shaft is forced into the assembled core segments C1 and C2. The shafted core is then removed by a crane and taken to the tissue processing facility where new rolls of tissue are wrapped on the core.

In some installations core segments can be delivered in separate bins in separated locations along the trough 106. FIG. 1A, for example, shows a second core handling apparatus 26a of the same type as apparatus 26. However, the apparatus 26a may by alongside the apparatus 26 or, as shown in FIG. 1A, may be on the opposite side of the trough. As shown in FIG. 1A, the second apparatus 26a is for handling core segments of a length greater than the segments of apparatus 26 although they can all be of the same length. For example, one typical length is 102 inches while another may be only 60 inches.

Having described the apparatus and the method, the method can again be summarized by viewing FIGS. 10A–11E. The full roll tissue is delivered. The filled tissue roll is advanced to the shaft pulling and inserting station 22. The table is raised until the recess 34 enters the forks 32. The sensors 58 and 60 then determine the inclination of the shaft axis and raise or lower the remote end of the shaft pulling and inserting apparatus by rotating the screw 56. The roll stop 46 is then lowered and the forks 32 retracted to the right as shown in FIG. 10D to pull the shaft from the filled rolls. The rolls are then discharged off the table and taken subsequently to a tissue processing facility where the tissue is removed from the cores. The core segments are collected in bins and returned in the bin where the bin is tipped and the core segments are released as shown in FIG. 11A. The core segments are then advanced one at a time by oscillating the stops 96 and 102 until an individual core segment is deposited on the trough 106. Core segments are then shifted individually to the right and where applicable a spacer ring SR is placed between the core segments. The core segments are then pushed onto the table 66 where they are subsequently raised to the level of the shaft. The shaft inserting apparatus then pushes the shaft back into the assembled core segments to complete the reshafting of the unfilled cores.

While the embodiments of the invention have been illustrated and described, it should be understood that variations will be apparent to one skilled in the art. Accordingly, the invention is not to be limited to the specific embodiments illustrated in the drawing.

We claim:

1. A method of automatically removing shafts from the cores of a filled tissue roll or the like and reinstalling the shafts within unfilled cores, comprising:

positioning a filled tissue roll having a shaft at a shaft removing and inserting station;

removing the shaft at the shaft removing and inserting station by moving the shaft along a removing axis;

removing the shaft-free roll;

automatically positioning an unfilled core at the shaft removing and inserting station;

inserting the shaft into the unfilled core; and wherein the filled tissue roll has its shaft axis lying at an angle to the horizontal, and including adjusting the angle of the removing axis to be coincident with the angled axis of the shaft.

2. The method of claim 1 wherein the shaft is removed by pulling the shaft relative to the core.

3. The method of claim 1, including sensing the position of one end of the shaft and sensing the position of the second end of the shaft to determine the angle of the axis of the shaft with respect to the horizontal, and adjusting the angle of the removing axis by vertically adjusting the end of the removing axis furthest from the shaft.

4. The method of claim 1, said step of positioning an unfilled core including automatically separating a core segment from a batch of core segments.

5. The method of claim 4, said step of automatically separating a core segment including releasing a first core segment from a batch of core segments, moving the separated first core segment laterally to a core assembling station, moving a second core segment to a second position coaxially aligned with the first core segment, and moving the core segments to said shaft pulling and inserting station.

6. The method of claim 5, wherein said core segments are separated from one another by a spacer gap, and including the step of automatically inserting a spacer ring into said spacer gap by moving the spacer laterally into and between said separated core segments.

7. The method of claim 1, said step of positioning the unfilled core at the shaft removing and inserting station including assembling core segments into an unfilled core, placing the shaft removing axis in a generally horizontal position, raising said core with its center axis to a location aligned with the shaft removing axis in the generally horizontal position, and pushing the shaft and assembled core relative to one another to insert the shaft in the assembled core.

8. The method of removing a shaft from a filled tissue roll having a core and a shaft having a central shaft axis in the core, the shaft axis lying at an angle to the horizontal, comprising automatically sensing the angle of the shaft axis, automatically aligning a shaft remover having a removing axis into an angle with the removing axis aligned with the shaft axis, and moving the shaft along the removing axis to remove the shaft from the roll.

9. The method of claim 8 wherein the shaft is moved by pulling the shaft from the core.

10. The method of claim 8, the shaft remover having a roll end and a remote end, said step of automatically sensing the angle of the shaft axis including sensing the shaft vertical position at a first end adjacent the shaft removing roll end, sensing the vertical position at a second end remote from the shaft remover, and vertically adjusting the remote end of the shaft remover to align the removing axis to be coincident with the shaft axis.

11. The method of automatically assembling unfilled paper roll cores for reinstalling shafts in constructed cores comprising:

collecting core segments laying on one another within a movable bin;

automatically separating a first core segment from said bin;

automatically separating a second core segment from said movable bin;

positioning the first and second core segments in axial alignment with each other in a trough but axially spaced from one another by a spacer gap;

inserting a spacer ring transversely of said core segments between said core segments in said trough into said spacer gap; and moving the first core segment to a shaft inserting location.

12. Apparatus for automatically removing and inserting a shaft from a filled paper roll having a heavy core and a shaft with a central axis within said core, comprising:

means for delivering a filled paper roll with said core and shaft to a shaft pulling and inserting apparatus;

said shaft pulling and inserting apparatus having a roll end and a remote end spaced from said roll end, said shaft pulling and inserting apparatus operative to pull the shaft from the core;

means for discharging the shaftless filled roll;

a core assembling station including a core segment bin for holding a plurality of core segments with their central axes all parallel and horizontal, means for tipping the bin, means for separating the core segments individually from the bin including a gate operable to release said cores in two vertically spaced levels, means for releasing a first core segment from the lower level separated from all other core segments to move to a core positioning trough, core moving means at said positioning trough to move a first core segment axially to a first position, said core moving means operable to move a second core segment axially aligned with said first core segment to a second position, and said core moving means being operable to move said first and second core segments as an assembled core to said shaft pulling and inserting apparatus;

means for pushing a shaft into said assembled core.

13. The apparatus of claim 12 wherein the core segments are axially spaced by a spacer gap, and means for inserting a spacer ring into said spacer gap.

14. Apparatus for removing a shaft having a central axis aligned with the horizontal from a filled roll having a core with said shaft therein, comprising:

a shaft removing apparatus having first and second ends, means for delivering said filled roll to said shaft pulling apparatus;

means for automatically sensing the angle of said shaft central axis;

means responsive to the angle of the central axis sensed to adjust one end of the shaft removing apparatus to align the shaft removing apparatus to have a removing axis coincident with said angled central axis of the shaft; and means on said shaft removing apparatus to remove the shaft from said roll along the inclined removing axis.

15. The apparatus of claim 14 said shaft removing apparatus including means for pulling the shaft.

16. The apparatus of claim 15, said first end of said shaft removing apparatus being a remote end removed from the roll, said second end of said shaft removing apparatus being a roll end adjacent to said roll, the means to adjust said one end of the shaft removing apparatus operable to raise and lower said remote end.

17. The apparatus of claim 16, said means to adjust said remote end of said shaft removing apparatus including a rotatable screw jack.

18. The apparatus of claim 14, said sensing means including a first sensor to determine the vertical position of one end of said shaft adjacent said shaft removing apparatus, and a second sensor for determining the vertical position of the second end of said shaft remote from said shaft removing apparatus.

19. The apparatus of claim 14, including a roll stop carried by said shaft removing apparatus and means for positioning the roll stop against an end of the roll for holding the roll as the shaft is removed.

20. Apparatus for assembling a core from individual core segments comprising means for automatically axially aligning unfilled core segments, means for automatically moving said assembled core segments to a shaft inserting apparatus, and means for inserting a shaft into said assembled core, said core segments being held in a batch of stacked core segments with central core axes parallel and generally horizontal, a tipper mechanism for holding said batch of core segments, means for releasing the core segments, means for individually advancing an endmost core segment from a bottom of said rows to said axial aligning means.

21. The apparatus of claim 20, said axial aligning means comprising a core segment trough, pusher means on said trough for pushing a first segment to a first position on said trough, said pusher being operable to push a second segment to a second position on said trough aligned with said first segment but axially spaced therefrom, means for inserting a spacer ring between said two spaced segments, said pusher means being operable to push said assembled first and second segments and said spacer ring as a unit axially beyond said first position to said assembled core moving means.

22. Apparatus for assembling a core for holding rolled tissue paper from individual core segments comprising means for automatically axially aligning unfilled heavy core segments suitable for winding tissue paper, means for automatically moving said assembled core segments to a shaft inserting apparatus, said shaft inserting apparatus including a table for holding both the assembled core segments and in the alternative full rolls of tissue wound on cores, and means for inserting a shaft into said assembled core, said means for inserting a shaft into said assembled core including shaft pushing means, said table including a core positioning table movable vertically to raise the assembled core, and retractable core holding means on said table for holding an end of the assembled core when said shaft is pushed into the core.

23. Apparatus for assembling a core for holding rolled tissue paper from individual core segments comprising means for automatically axially aligning unfilled heat core segments suitable for winding tissue paper, said means for automatically aligning unfilled core segments including a trough having opposite sides, means for depositing core segments on said trough from opposite sides of said trough, means for automatically moving said assembled core segments to a shaft inserting apparatus, said shaft inserting apparatus including a table for holding both the assembled core segments and in the alternative full rolls of tissue wound on cores, and means for inserting a shaft into said assembled core.

* * * * *

UNITED STATES PATENT AND TRADEMARK OFFICE
CERTIFICATE OF CORRECTION

PATENT NO. : 5,535,493
DATED : July 16, 1996
INVENTOR(S) : John A. Hill et al.

It is certified that error appears in the above-indentified patent and that said Letters Patent is hereby corrected as shown below:

In column 10, claim 23, line 23, please delete "heat" and insert therefor --heavy--.

Signed and Sealed this

Thirty-first Day of December, 1996

Attest:

BRUCE LEHMAN

*Attesting Officer*   *Commissioner of Patents and Trademarks*